United States Patent
Chu et al.

(10) Patent No.: US 12,135,734 B2
(45) Date of Patent: *Nov. 5, 2024

(54) REPLICATION OF SHARE ACROSS DEPLOYMENTS IN DATABASE SYSTEM

(71) Applicant: Snowflake Inc., Bozeman, MT (US)

(72) Inventors: Pui Kei Johnston Chu, Richmond Hill (CA); Benoit Dageville, San Mateo, CA (US); Shreyas Narendra Desai, Bellevue, WA (US); Nithin Mahesh, Kirkland, WA (US); Subramanian Muralidhar, Mercer Island, WA (US); Vishnu Dutt Paladugu, Seattle, WA (US); Sahaj Saini, Seattle, WA (US); Chieh-Sheng Wang, San Mateo, CA (US); Di Wu, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,787

(22) Filed: May 26, 2023

(65) Prior Publication Data

US 2023/0297591 A1    Sep. 21, 2023

Related U.S. Application Data

(63) Continuation of application No. 17/652,721, filed on Feb. 28, 2022, now Pat. No. 11,704,338.

(51) Int. Cl.
| | |
|---|---|
| *G06F 16/30* | (2019.01) |
| *G06F 16/21* | (2019.01) |
| *G06F 16/25* | (2019.01) |
| *G06F 16/27* | (2019.01) |

(52) U.S. Cl.
CPC ............ *G06F 16/27* (2019.01); *G06F 16/213* (2019.01); *G06F 16/256* (2019.01)

(58) Field of Classification Search
CPC ....... G06F 16/27; G06F 16/256; G06F 16/213
See application file for complete search history.

(56) References Cited

U.S. PATENT DOCUMENTS

| | | |
|---|---|---|
| 2003/0200229 A1 | 10/2003 | Cazier |
| 2010/0095297 A1* | 4/2010 | Sethi ......................... G06F 9/50 718/1 |
| 2019/0213265 A1 | 7/2019 | Boerner et al. |

(Continued)

OTHER PUBLICATIONS

"U.S. Appl. No. 17/652,721, Examiner Interview Summary mailed Sep. 9, 2022", 2 pgs.

(Continued)

*Primary Examiner* — Khanh B Pham
(74) *Attorney, Agent, or Firm* — Schwegman Lundberg & Woessner, P.A.

(57) ABSTRACT

Various embodiments provide for replicating a share across deployments of a data platform, where the share can be on a source deployment and the share can be replicated on one or more target deployments, and where the share is replicated with one or more database objects of the source deployment associated with the share. Some embodiments analyze the share to be replicated and, based on the analysis, determine one or more database objects that would be replicated to the one or more target deployments to enable a replica of the share on the one or more target deployments.

20 Claims, 7 Drawing Sheets

(56) References Cited

U.S. PATENT DOCUMENTS

2020/0401314 A1* 12/2020 Chen .................. G06F 11/2082
2021/0200822 A1   7/2021 O'brian et al.
2021/0250400 A1   8/2021 Chu et al.
2021/0271692 A1* 9/2021 Kumar ................ G06F 11/2058

OTHER PUBLICATIONS

"U.S. Appl. No. 17/652,721, Examiner Interview Summary mailed Nov. 22, 2022", 2 pgs.
"U.S. Appl. No. 17/652,721, Final Office Action mailed Sep. 23, 2022", 11 pgs.
"U.S. Appl. No. 17/652,721, Non Final Office Action mailed Jun. 10, 2022", 12 pgs.
"U.S. Appl. No. 17/652,721, Notice of Allowance mailed May 15, 2023", 10 pgs.
"U.S. Appl. No. 17/652,721, Response filed Sep. 12, 2022 to Non Final Office Action mailed Jun. 10, 2022", 14 pgs.
"U.S. Appl. No. 17/652,721, Response filed Dec. 22, 2022 to Final Office Action mailed Sep. 23, 2022", 11 pgs.

* cited by examiner

000000000000

REPLICATION OF SHARE ACROSS DEPLOYMENTS IN DATABASE SYSTEM

PRIORITY CLAIM

This application is a Continuation of U.S. patent application Ser. No. 17/652,721, filed Feb. 28, 2022, the contents of which are hereby incorporated by reference in their entirety.

TECHNICAL FIELD

Embodiments of the disclosure relate generally to databases and, more specifically, to replication of a share across database deployments in a database system.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like. A given table may be organized as records (e.g., rows) that each include one or more attributes (e.g., columns). A data platform may physically store database data in multiple storage units, which may be referred to as blocks, micro-partitions, and/or by one or more other names.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
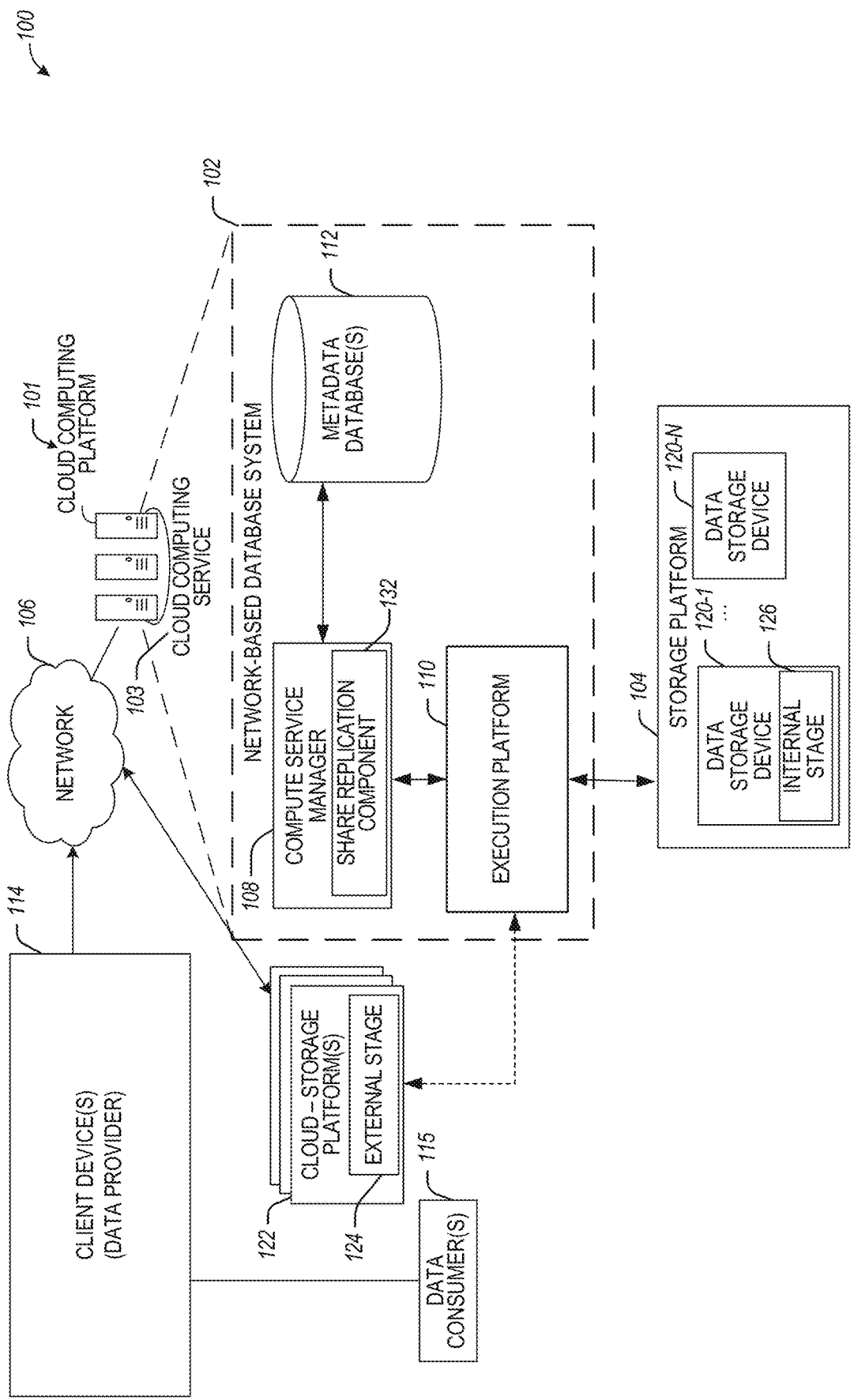
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

On some data platforms, one account (e.g., a provider account) can share one or more databases or database objects with one or more other accounts (e.g., consumer accounts). As used herein, a share created by an account (e.g., provider account) can comprise one or more privileges that grant access to a specified database or to one or more specified database objects of a database (e.g., specified by share data that defines the share), and can specify one or more other accounts (e.g., consumer accounts) that are sharing the specified database/specified database objects by way of the one or more privileges. For some embodiments, changes to a definition of a share (e.g., made by a provider account) are enforced at or near real-time with respect to the one or more accounts (e.g., consumer accounts) receiving database/database object access by way of the share. Changes can include, for example, adding access to a new database or database object, removing access to an existing database or database object, adding a new account (e.g., consumer account) to the share, or removing an existing account (e.g., consumer account) from the share. As used herein a database object can include, without limitation, a table, a schema, a view, a stream, a task, and the like.

Traditionally, if a user of a first account (e.g., provider account) wishes to replicate a share of a source deployment (e.g., share created by the first account) to a target deployment, the user of the first account has to manually review a definition of the share, and determine (e.g., identify) one or more database objects specified by the share. The user would then manually replicate the determined (e.g., identified)

database objects tied to these determined database objects and manually generate (e.g., create) a replica of the share (e.g., replicated share) on the target deployment based on the one or more database objects and the tied database objects.

Aspects of the present disclosure include systems, methods, and devices that replicate a share across deployments of a data platform, where the share can be on a source deployment and the share can be replicated on one or more target deployments, and where the share is replicated with one or more database objects of the source deployment associated with (e.g., referenced by) the share. In particular, some embodiments analyze the share (e.g., analyzes or introspects the definition of the share) to be replicated and, based on the analysis, determine one or more database objects that would be replicated to the one or more target deployments to enable a replica of the share (e.g., the replicated share) on the one or more target deployments. Some embodiments replicate the determined one or more database objects on the one or more target deployments, and configure the replica of the share to make use of (e.g., to reference) the one or more data objects replicated on the one or more target deployments.

For some embodiments, a first account (e.g., producer account) on one deployment (e.g., source deployment) of a data platform creates a second account (e.g., consumer account) on another deployment (e.g., target deployment) of the data platform. As used herein, a deployment can refer to a physical/geographical location, a vendor, a provider, or a computing device that stores a copy of database data. In some instances, it can be beneficial to replicate database data across multiple deployments. Doing so can provide significant benefits to a database client, as the data is backed up in more than one location. In the event that one deployment is unavailable due to, for example, a power outage, a system error, a scheduled maintenance downtime, and so forth, a failover process ensures a different deployment takes over the management and operation of the database.

According to some embodiments, a first account on (e.g., producer account residing on or associated with) a source deployment of a data platform generates (e.g., creates) a share on the source deployment, where the source share is configured to grant one or more other accounts access to a set of database objects associated with (e.g., owned by) the first account. For instance, the set of database objects can include an access grant, a database, a table, or a view on the source deployment. The first account can add a second account (e.g., consumer account) to the share. For example, a user associated with the first account can enter or issue the following command to add an account 'c1' to a share 's1': "ALTER SHARE s1 ADD ACCOUNT c1". When the first account adds the second account to the share, an embodiment can determine (e.g., detect) whether the second account is on (e.g., resides on or associate with) the source deployment (that the first account is on) or a deployment of the data platform that is different from the source deployment. In response to determining that the second account is on a (target) deployment that is different from the source deployment, an embodiment can automatically determine (e.g., generate or infer) a replication group for the share based on the definition of the share. The determined replication group can be configured to replicate the share on the target deployment. An embodiment can generate (e.g., create) a replica of the share on the target deployment. Hereafter, the replica of the share on the target deployment can be referred to as the replicated share. Depending on the embodiment, the replicated share can be generated in association with a shadow account of the first account (e.g., created in the first account's shadow account target region) on the target deployment. Additionally, an embodiment can determine (e.g., identify) one or more database objects (on the source deployment) from which one or more of the set of database objects (on the source deployment) depend. The set of database objects and the determined one or more database objects are replicated on the target deployment. For instance, the set of database objects and the determined one or more databases can be replicated into a hidden namespace on the target deployment. The determined replication group can be configured with a refresh schedule. The refresh schedule can enable a change (e.g., delta) to a shared database object, or a database object from which it depends, on the source deployment is applied to the target deployment, and vice versa. Further, the refresh schedule can enable a change (e.g., delta) to a definition of the share on the source deployment (e.g., change by the first account) can be applied to a definition of the replica share on the target deployment.

By use of various embodiments described herein, a user associated with a first account (e.g., provider account) on a source deployment can replicate a share of the source deployment on a second deployment (e.g., in association with a second account, such as a consumer account) without the user needing to manually inspect the contents of the share. For instance, for a share of a source deployment being replicated to a target deployment and where the share grants access to a view, a user of the first account can avoid having to manually inspect the definition of the view recursively to determine (e.g., identify) one or more base tables of the source deployment (referenced by the view) that would be replicated to the target deployment in order to replicate the share on the target deployment. A share replication facilitated by various embodiments can be useful when a second account (e.g., consumer account to the share) is added to the share, and the first account and the second account are on different deployments (e.g., first account on the source deployment and the second account on the target deployment). Additionally, use of various embodiments described herein can obviate a need for the user of the first account (e.g., producer account) to monitor for new database/database object grants and revocations to the share or any changes to a view definition referenced by the share.

The various embodiments that are described herein are described with reference where appropriate to one or more of the various figures.

FIG. 1 illustrates an example computing environment 100 that includes a database system in the example form of a network-based database system 102, in accordance with some embodiments of the present disclosure. For some embodiments, the network-based database system 102 implements replication of a share across deployments in the network-based database system 102 as described herein. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., replication of a share across deployments network-based database system 102 as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers (e.g., associated with consumer accounts) and providers (e.g., associated with provider accounts). Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, a users account object of the user's account object type lists users authorized to access at least one target account (e.g., an account of a data provider or data consumer 115). A user account object can, for example, be associated with a producer account or a consumer account. In some embodiments, a roles account object of the roles account object type configures privileges for the users to access the at least one target account. A role account object can, for example, be associated with a producer account or a consumer account. In some aspects, a warehouse object of the warehouse object type indicates compute resources (e.g., at least one virtual warehouse of the execution platform 110) for executing a workload associated with one or more databases of the data provider. In some embodiments, a resource monitor object of the resource monitor object type configures monitoring usage of the compute resources.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
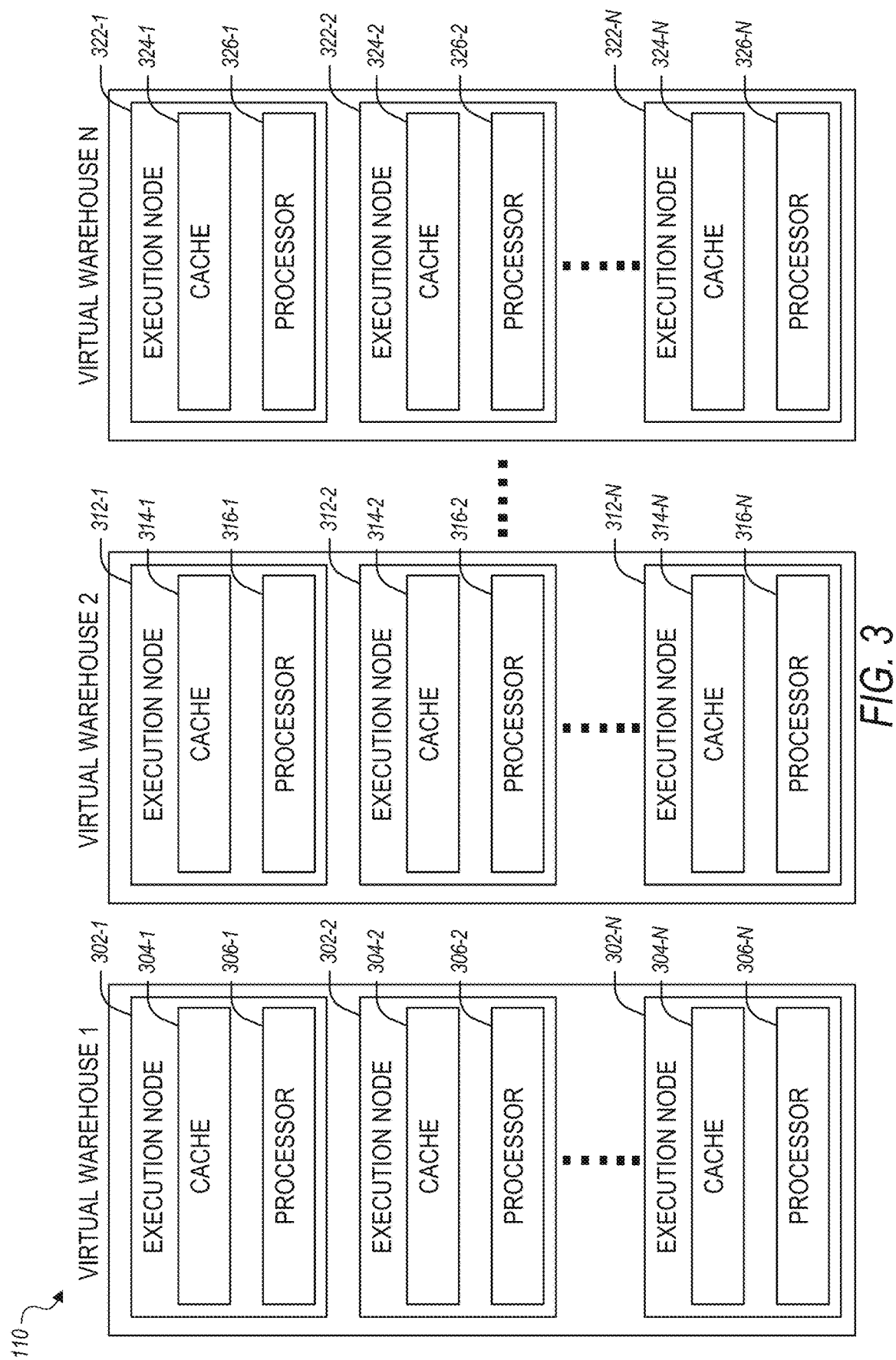
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the compute service manager 108 includes a share replication component 132 that comprises suitable circuitry, interfaces, logic, and/or code and is configured to perform the disclosed functionalities associated with (e.g., enabling) replication of a share across deployments in the network-based database system 102. For instance, the share replication component 132 of some embodiments can implement (or otherwise support) replication of a share from one deployment to another deployment with a set of database objects associated with (e.g., referenced by the share) and with one or more database objects from which one or more of the set of database objects depend. For example, the share replication component 132 can facilitate automatic replication of a share of a first account on a source deployment, to a target deployment on which a second account resides, in response to the first account adds the second account to the share and an embodiment detects that the second account is not on the same deployment (i.e., the source deployment) as the first account. More regarding replication of a share across database deployments is discussed in connection with FIG. 4-FIG. 6.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
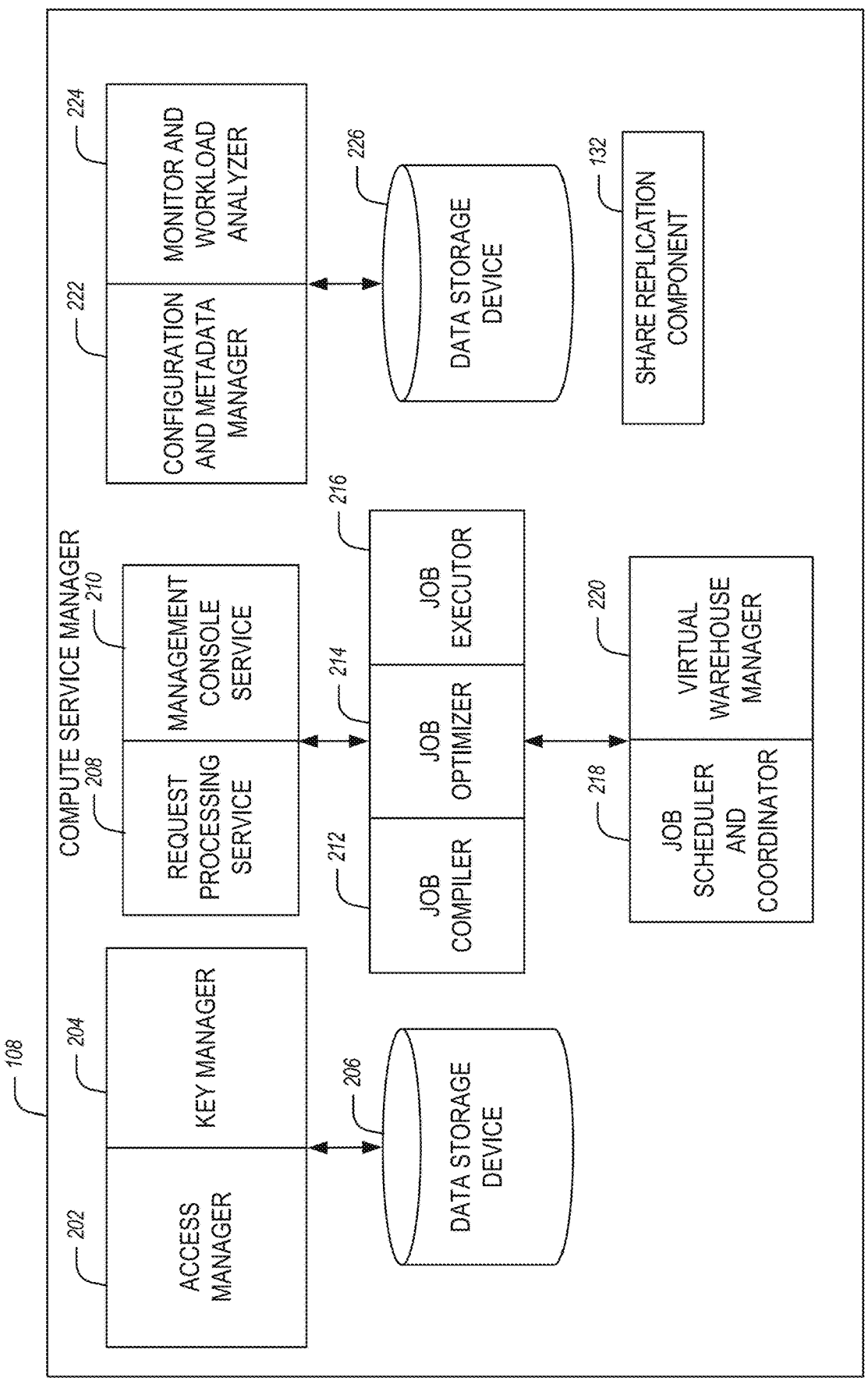
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to a data storage device 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the share replication component 132 configured to perform the disclosed functionalities associated with replicating a share across deployments of a data platform.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
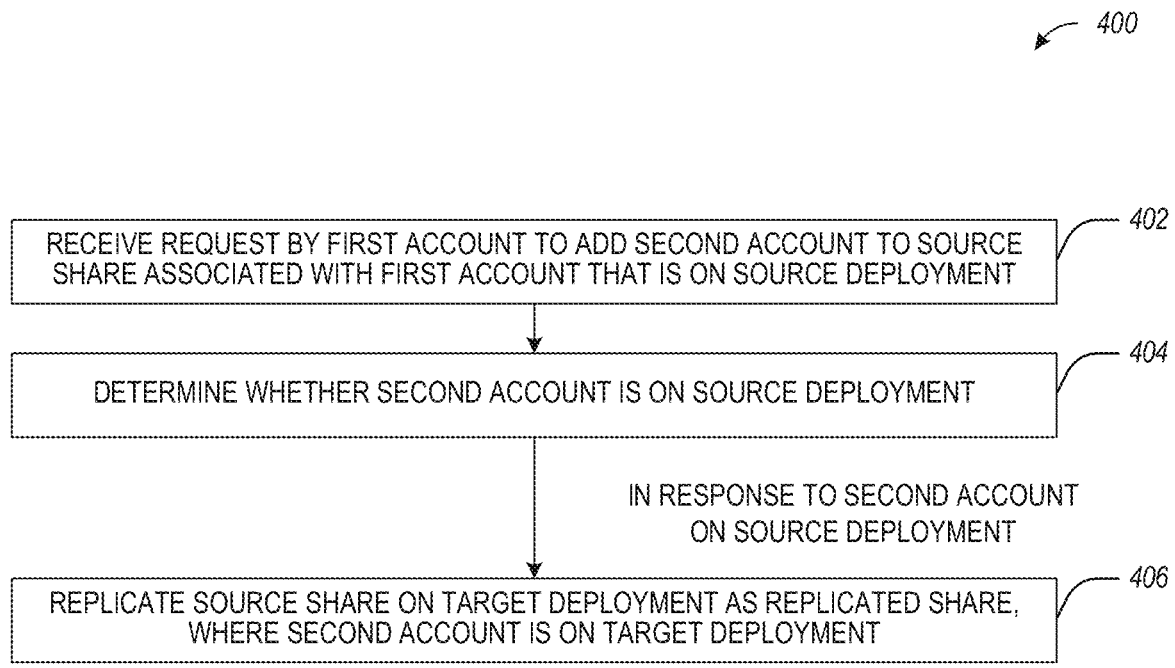
FIG. 4 and FIG. 5 are flow diagrams illustrating example methods for replicating a share across deployments of a data platform, in accordance with some embodiments of the present disclosure.

FIG. 4 is a flow diagram illustrating an example method 400 for replicating a share across deployments of a data platform, in accordance with some embodiments of the present disclosure. Method 400 may be embodied in computer-readable instructions for execution by one or more hardware components (e.g., one or more processors) such that the operations of the method 400 may be performed by components of the network-based database system 102, such as the share replication component 132 or computing device which may be implemented as machine 700 of FIG. 7 and may be configured with an application connector performing the disclosed functions. Accordingly, method 400 is described below, by way of example with reference thereto. However, it shall be appreciated that method 400 may be deployed on various other hardware configurations and is not intended to be limited to deployment within the network-based database system 102. For some embodiments, the method 400 is performed on or by one or more processing devices of a source deployment.

At operation 402, a processing device (e.g., comprising a hardware processor) receives a request by a first account to add a second account to a source share associated with the first account, where the first account is on a source deployment of a data platform. For some embodiments, the source share is configured to grant one or more accounts (e.g., those added to the share) access to a set of database objects (e.g., an access grant, a table, a view, or a schema) associated with the first account. The first account can represent a producer account and the second account can represent a consumer account. The source share can be created on the source deployment by the first account. For instance, the first account can create a share s1' by issuing the following instruction on the source deployment: "CREATE SHARE s1." To add an account 'c1' to an existing share 's1,' the request by the first user can comprise, or cause the performance of, the following instruction on the source deployment: "ALTER SHARE s1 ADD ACCOUNT=c1."

During operation 404, the processing device determines, based on the request received by operation 402, whether the second account is on the source deployment. In response to determining that the second account is on the source deployment, the definition of the share can be altered to grant the second account access to the set of database objects, and one or more database objects they depend from, stored on the source deployment.

Alternatively, in response to determining that the second account is not on the source deployment, at operation 406, the processing device replicates the source share on a target deployment of the data platform as a replicated share, where the second account is on the target deployment. For various embodiments, the replicated share represents a replica of the source share on the target deployment. Additionally, for various embodiments, the replicated share references the replicated set of database objects on the target deployment.

According to some embodiments, replicating the source share on the target deployment as the replicated share comprises accessing, on the source deployment, share data defining the source share, and generating, based on the share data, the replicated share on the target deployment. For instance, based on the share data, the replicated share on the target deployment is generated by replicating the set of database objects, of the source deployment, on the target deployment (e.g., based on the definition of the source data provided by the accessed share data). Additionally, based on the share data, the replicated share on the target deployment is generated by determining, based on the share data, a set of dependencies that identify one or more database objects (e.g., base tables) on the source deployment from which at least one database object (e.g., a view) of the set of database objects depends. Thereafter, the determined one or more database objects of the source deployment are replicated on the target deployment. For some embodiments, the set of database objects, the determined one or more database objects, or both are replicated into a hidden namespace on the target deployment. The hidden namespace can be associated with a shadow account of the first account. The replication of the share, the set of database objects, and the one or more database objects (from which at least one of the set of database objects depends) can achieve transitive closure with respect to the replication of the share.

During operation 406, a replication group can be generated (e.g., created) on the source deployment, where the replication group is configured to replicate the source share on the target deployment as the replicated share. For some embodiments, the generation of the replication group can invoke or cause the replication of the set of database objects, the determined one or more database objects, or both on the target deployment as described herein. For instance, the replication by operation 406 can comprise the following instruction performed on the source deployment to create a replication group 'rg1' on the source deployment that replicates a share 's1' of the source deployment on a target deployment (e.g., AWSWEST) associated with an account PROD_AWSWEST with transitive closure enabled (to enable replication of a set of database objects of the share 's1' and database objects from which the set of database objects): "CREATE REPLICATION GROUP rg1 INCLUDE SHARES (s1) REPLICATION_ALLOWED_TO_ACCOUNTS=(PROD_AWSWEST) WITH TRANSITIVE_CLOSURE=true." Additionally, for some embodiments, the replication group is configured with a refresh schedule, which can enable changes on the source deployment to the share (e.g., definition of the share) or associated database objects (e.g., the set of database objects or the determined one or more database objects) to be applied to replicas of the same on the target deployment. The refresh schedule can also enable changes on target deployment to replicas of database objects associated with the share to be applied to corresponding database objects on the source deployment.

For some embodiments, operation 406 replicates the source share on the target deployment as the replicated share by generating the replicated share on the target deployment with a same name as the source share of the source deployment. Additionally, for some embodiments, the replicated share references, and is configured to grant the second account with access to, the set of database objects replicated on the target deployment (e.g., in a manner similar to how the source share would grant the second account access to the set of data objects on the source deployment if the second account was on the source deployment). In various embodiments, generating the replicated share on the target deployment results in generation of a definition of the replicated share (e.g., shared data for the replicated share) on the target deployment, where the definition references the replicated set of database objects on the target deployment. When generating the replicated share on the target deployment with the same name as the source share of the source deployment, the processing device can determine whether an existing share on the target deployment already has the same name as the source share. In response to determining that an existing share on the target deployment does not have the same name, generation of the replicated share with the same name can proceed. However, in response to determining that an existing share on the target deployment already has the same name, a user of the first account can be notified of the name conflict, or can be prompted to rename the replicated share to a different name (e.g., the user can be prompted with one or more alternative names to be used for the replicated share). Alternatively, in response to a name conflict, the replication of the share on the target deployment can be failed, and a user of the first account can be notified of the failure.

Figure 5:
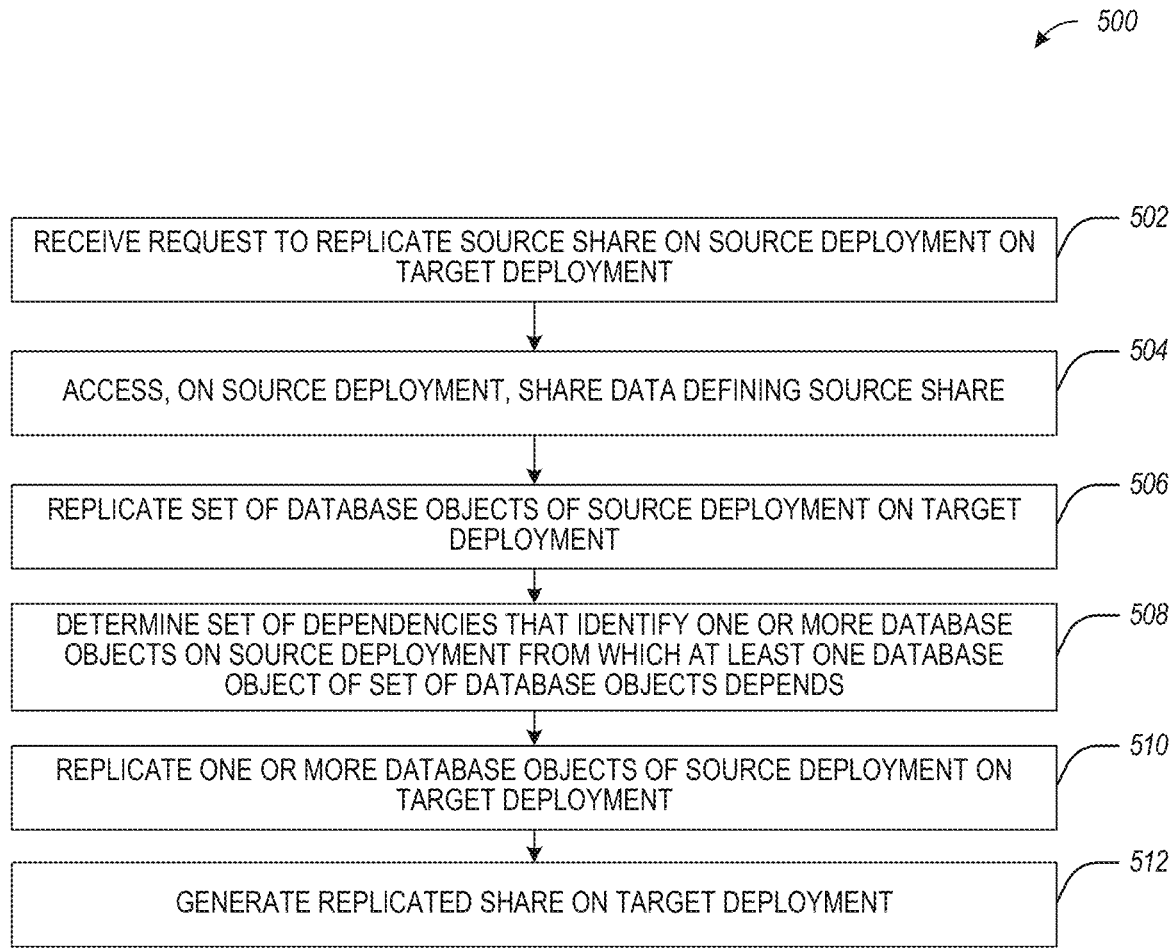

FIG. 5 is a flow diagram illustrating an example method 500 for replicating a share across deployments of a data platform, in accordance with some embodiments of the present disclosure. Method 500 may be embodied in computer-readable instructions for execution by one or more hardware components (e.g., one or more processors) such that the operations of the method 500 may be performed by components of the network-based database system 102, such as the share replication component 132 or computing device which may be implemented as machine 700 of FIG. 7 and may be configured with an application connector performing the disclosed functions. Accordingly, method 500 is described below, by way of example with reference thereto. However, it shall be appreciated that method 500 may be deployed on various other hardware configurations and is not intended to be limited to deployment within the network-based database system 102. For some embodiments, the method 500 is performed on or by one or more processing devices of a source deployment.

At operation 502, a processing device (e.g., comprising a hardware processor) receives a request by a first account to replicate a source share, of a source deployment of a data platform, on a target deployment of the data platform. For some embodiments, the source share is configured to grant one or more accounts (e.g., those added to the share) access to a set of database objects (e.g., an access grant, a table, a view, or a schema) associated with the first account. The first account can represent a producer account. The source share can be created on the source deployment by the first account. For instance, the first account can create a share s1' by issuing the following instruction on the source deployment: "CREATE SHARE s1." To replicate the source share on the target deployment, the request by the first user can cause, or comprise an instruction that causes, the creation of a replication group that includes the source share and specifies the target deployment or a second account on the target deployment. For instance, the request by the first user can comprise, or cause the performance of, the following instruction on the source deployment (e.g., AWSEAST) to create a replication group 'rg1' on the source deployment that replicates a share s1' of the source deployment on a target deployment (e.g., AWSWEST) associated with an account PROD_AWSWEST with transitive closure enabled (to enable replication of a set of database objects of the share s1' and database objects from which the set of database objects): "CREATE REPLICATION GROUP rg1 INCLUDE SHARES (s1) REPLICATION_ALLOWED_TO_ACCOUNTS=(PROD_AWSWEST) WITH TRANSITIVE_CLOSURE=true." Additionally, for some embodiments, the replication group is configured with a refresh schedule, which can enable changes on the source deployment to the share (e.g., definition of the share) or associated database objects (e.g., the set of database objects or the determined one or more database objects) to be applied to replicas of the same on the target deployment. The refresh schedule can also enable changes on target deployment to replicas of database objects associated with the share to be applied to corresponding database objects on the source deployment.

Alternatively, the request by the first user can comprise or cause the modification of an existing replication group to include the source share and to specify the target deployment. For instance, the request by the first user can comprise, or cause the performance of, an instruction on the source deployment (e.g., AWSEAST) to alter a replication group 'rg1' of the source deployment to include a share 's1' of the source deployment and to replicate the share on a target deployment (e.g., AWSWEST) associated with an account PROD_AWSWEST with transitive closure enabled (to enable replication of the set of database objects and database objects from which the set of database objects): "ALTER REPLICATION GROUP rg1 SET INCLUDE SHARES=s1; ALTER REPLICATION GROUP rg1 SET REPLICATION_ALLOWED_TO_ACCOUNTS=(PROD_AWSWEST); ALTER REPLICATION GROUP rg1 SET TRANSITIVE_CLOSURE=true."

In response to the request received by operation 502, operations 504 through 510 can be performed to facilitate replication of the source share on the target deployment. In particular, at operation 504, the processing device accesses, on the source deployment, share data that defines the source share. Based on the accessed share data, at operation 506, the processing device replicates the set of database objects, of the source deployment, on the target deployment. Additionally, at operation 508, the processing device determines based on the share data, a set of dependencies that identify one or more database objects on the source deployment from which at least one database object of the set of database objects depends. Subsequently, at operation 510, the processing device replicates the determined one or more database objects of the source deployment on the target deployment. At operation 512, the processing device generates the replicated share on the target deployment (e.g., with a same name as the source share of the source deployment). For some embodiments, the replicated share references, and is configured to grant the second account with access to, the set of database objects replicated on the target deployment (e.g., in a manner similar to how the source share would grant the second account access to the set of data objects on the source deployment if the second account was on the source deployment).

Figure 6:
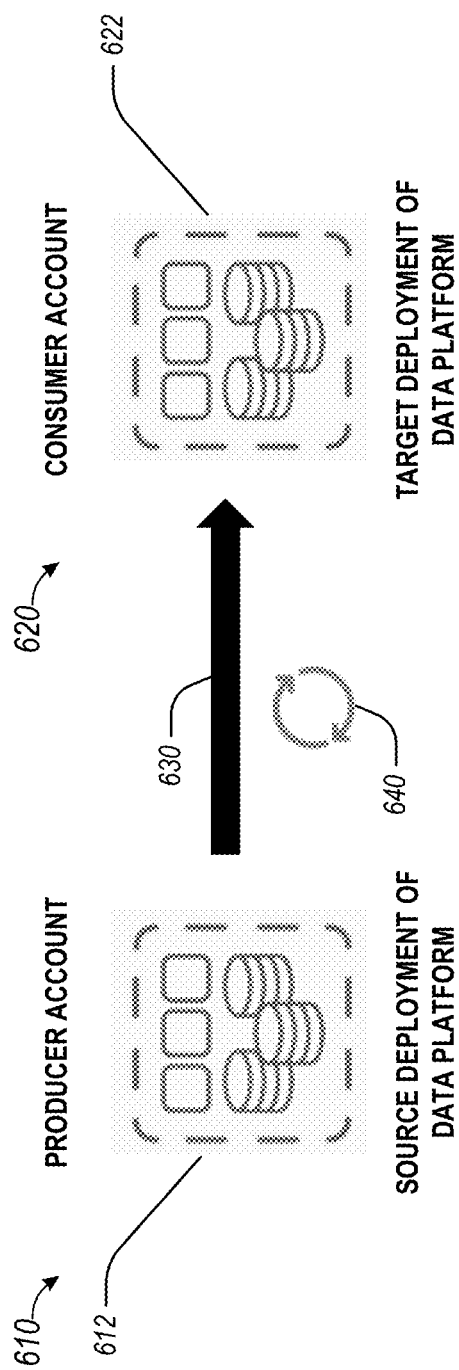
FIG. 6 is a conceptual diagram illustrating example replication of share of a source deployment of and a target deployment of a data platform, in accordance with some embodiments of the present disclosure.

FIG. 6 is a conceptual diagram illustrating example replication of share of a source deployment 610 of and a target deployment 620 of a data platform, in accordance with some embodiments of the present disclosure. As illustrated, a producer account resides on the source deployment 610, and a consumer account resides on the target deployment 620. The source deployment 610 comprises a share 612 (e.g., share group) that grants access to one or more database objects. According to some embodiments, in response to the producer account adds the consumer account to share 612, an embodiment can determine that the consumer account resides on the target deployment 620 and generate a replica of the share 612 on the target deployment 620, which is represented by replica share 622. In addition to replicating share 612 on the target deployment 620, the one or more database objects, and one or more database objects from which those database objects depend, can be replicated on the target deployment 620. Data flow 630 represents the replication process. Depending on the embodiment, the replication of share 612 and associated database objects can be facilitated by a replication group (e.g., replication group with transitive closure enabled). Such a replication group can be configured with a refresh schedule as described herein, which is symbolized by 640.

Described implementations of the subject matter can include one or more features, alone or in combination as illustrated below by way of example.

Described implementations of the subject matter can include one or more features, alone or in combination as illustrated below by way of example.

Example 1 is a data platform including: at least one hardware processor; and at least one memory storing instructions that cause the at least one hardware processor to perform operations including: receiving a request by a first account to add a second account to a source share associated with the first account, the source share being configured to grant one or more accounts access to a set of database objects associated with the first account, the first account being on a source deployment of the data platform; determining, based on the request, whether the second account is on the source deployment; and in response to determining that the second account is not on the source deployment, replicating the source share on a target deployment of the data platform as a replicated share, the second account being on the target deployment.

In Example 2, the subject matter of Example 1 includes subject matter where the replicating of the source share on the target deployment as the replicated share includes: accessing, on the source deployment, share data defining the source share; and generating, based on the share data, the replicated share on the target deployment.

In Example 3, the subject matter of any one of Examples 1-2 includes subject matter where the generating, based on the share data, the replicated share on the target deployment includes: replicating the set of database objects, of the source deployment, on the target deployment.

In Example 4, the subject matter of any one of Examples 1-3 includes subject matter where the generating, based on the share data, the replicated share on the target deployment includes: determining, based on the share data, a set of dependencies that identify one or more database objects on the source deployment from which at least one database object of the set of database objects depends; and replicating the one or more database objects, of the source deployment, on the target deployment.

In Example 5, the subject matter of any one of Examples 1-4 includes subject matter where the determining, based on the share data, the set of dependencies includes: determining, based on the share data, the set of database objects to which the source share is granting access on the source deployment.

In Example 6, the subject matter of any one of Examples 1-5 includes subject matter where the replicating of the one or more database objects on the target deployment includes: replicating the one or more database objects into a hidden namespace on the target deployment.

In Example 7, the subject matter of any one of Examples 1-6 includes subject matter where the replicating of the source share on the target deployment as the replicated share includes: generating, on the source deployment, a replication group configured to replicate the source share on the target deployment as the replicated share.

In Example 8, the subject matter of any one of Examples 1-7 includes subject matter where the replication group is configured with a refresh schedule.

In Example 9, the subject matter of any one of Examples 1-8 includes subject matter where the replicating of the source share on the target deployment as the replicated share includes: generating the replicated share on the target deployment with a same name as the source share of the source deployment, the replicated share being configured to grant the second account with access to the set of database objects replicated on the target deployment.

In Example 10, the subject matter of any one of Examples 1-9 includes subject matter where the generating of the replicated share on the target deployment with the same name as the source share includes: determining whether an existing share on the target deployment has the same name; and in response to determining that the existing share on the target deployment has the same name, prompting a user to rename the replicated share to a different name.

In Example 11, the subject matter of any one of Examples 1-10 includes subject matter where the set of database objects includes at least one of an access grant, a table, a view, or a schema.

Example 12 is a method including: receiving a request by a first account to add a second account to a source share associated with the first account, the source share being configured to grant one or more accounts access to a set of database objects associated with the first account, the first account being on a source deployment of a data platform; determining, based on the request, that the second account is not on the source deployment; and in response to determining that the second account is not on the source deployment, replicating the source share on a target deployment of the data platform as a replicated share, the second account being on the target deployment.

In Example 13, the subject matter of Example 12 includes subject matter where the replicating of the source share on the target deployment as the replicated share includes: accessing, on the source deployment, share data defining the source share; and generating, based on the share data, the replicated share on the target deployment.

In Example 14, the subject matter of any one of Examples 12-13 includes subject matter where the generating, based on the share data, the replicated share on the target deployment includes: replicating the set of database objects, of the source deployment, on the target deployment.

In Example 15, the subject matter of any one of Examples 12-14 includes subject matter where the generating, based on the share data, the replicated share on the target deployment includes: determining, based on the share data, a set of dependencies that identify one or more database objects on the source deployment from which at least one database object of the set of database objects depends; and replicating the one or more database objects, of the source deployment, on the target deployment.

In Example 16, the subject matter of any one of Examples 12-15 includes subject matter where the determining, based on the share data, the set of dependencies includes: determining, based on the share data, the set of database objects to which the source share is granting access on the source deployment.

In Example 17, the subject matter of any one of Examples 12-16 includes subject matter where the replicating of the one or more database objects on the target deployment includes: replicating the one or more database objects into a hidden namespace on the target deployment.

In Example 18, the subject matter of any one of Examples 12-17 includes subject matter where the replicating of the source share on the target deployment as the replicated share includes: generating, on the source deployment, a replication group configured to replicate the source share on the target deployment as the replicated share.

In Example 19, the subject matter of any one of Examples 12-18 includes subject matter where the replication group is configured with a refresh schedule.

In Example 20, the subject matter of any one of Examples 12-19 includes subject matter where the replicating of the source share on the target deployment as the replicated share includes: generating the replicated share on the target deployment with a same name as the source share of the source deployment, the replicated share being configured to grant the second account with access to the set of database objects replicated on the target deployment.

In Example 21, the subject matter of any one of Examples 12-20 includes subject matter where the generating of the replicated share on the target deployment with the same name as the source share includes: determining whether an existing share on the target deployment has the same name; and in response to determining that the existing share on the target deployment has the same name, prompting a user to rename the replicated share to a different name.

In Example 22, the subject matter of any one of Examples 12-21 includes subject matter where the set of database objects includes at least one of an access grant, a table, a view, or a schema.

Example 23 is a computer-readable medium including instructions that, when executed by one or more processors of a machine, configure the machine to perform operations including: receiving a request by a first account to add a second account to a source share associated with the first account, the source share being configured to grant one or more accounts access to a set of database objects associated with the first account, the first account being on a source deployment of a data platform; determining, based on the request, whether the second account is on the source deployment; and in response to determining that the second account is not on the source deployment, replicating the source share on a target deployment of the data platform as a replicated share, the second account being on the target deployment.

In Example 24, the subject matter of Example 23 includes subject matter where the replicating of the source share on the target deployment as the replicated share includes: accessing, on the source deployment, share data defining the source share; and generating, based on the share data, the replicated share on the target deployment.

In Example 25, the subject matter of any one of Examples 23-24 includes subject matter where the generating, based on the share data, the replicated share on the target deployment includes: replicating the set of database objects, of the source deployment, on the target deployment.

In Example 26, the subject matter of any one of Examples 23-25 includes subject matter where the generating, based on the share data, the replicated share on the target deployment includes: determining, based on the share data, a set of dependencies that identify one or more database objects on the source deployment from which at least one database object of the set of database objects depends; and replicating the one or more database objects, of the source deployment, on the target deployment.

In Example 27, the subject matter of any one of Examples 23-26 includes subject matter where the determining, based on the share data, the set of dependencies includes: determining, based on the share data, the set of database objects to which the source share is granting access on the source deployment.

In Example 28, the subject matter of any one of Examples 23-27 includes subject matter where the replicating of the one or more database objects on the target deployment includes: replicating the one or more database objects into a hidden namespace on the target deployment.

In Example 29, the subject matter of any one of Examples 23-28 includes subject matter where the replicating of the source share on the target deployment as the replicated share includes: generating, on the source deployment, a replication group configured to replicate the source share on the target deployment as the replicated share.

In Example 30, the subject matter of any one of Examples 23-29 includes subject matter where the replicating of the source share on the target deployment as the replicated share includes: generating the replicated share on the target deployment with a same name as the source share of the source deployment, the replicated share being configured to grant the second account with access to the set of database objects replicated on the target deployment.

Figure 7:
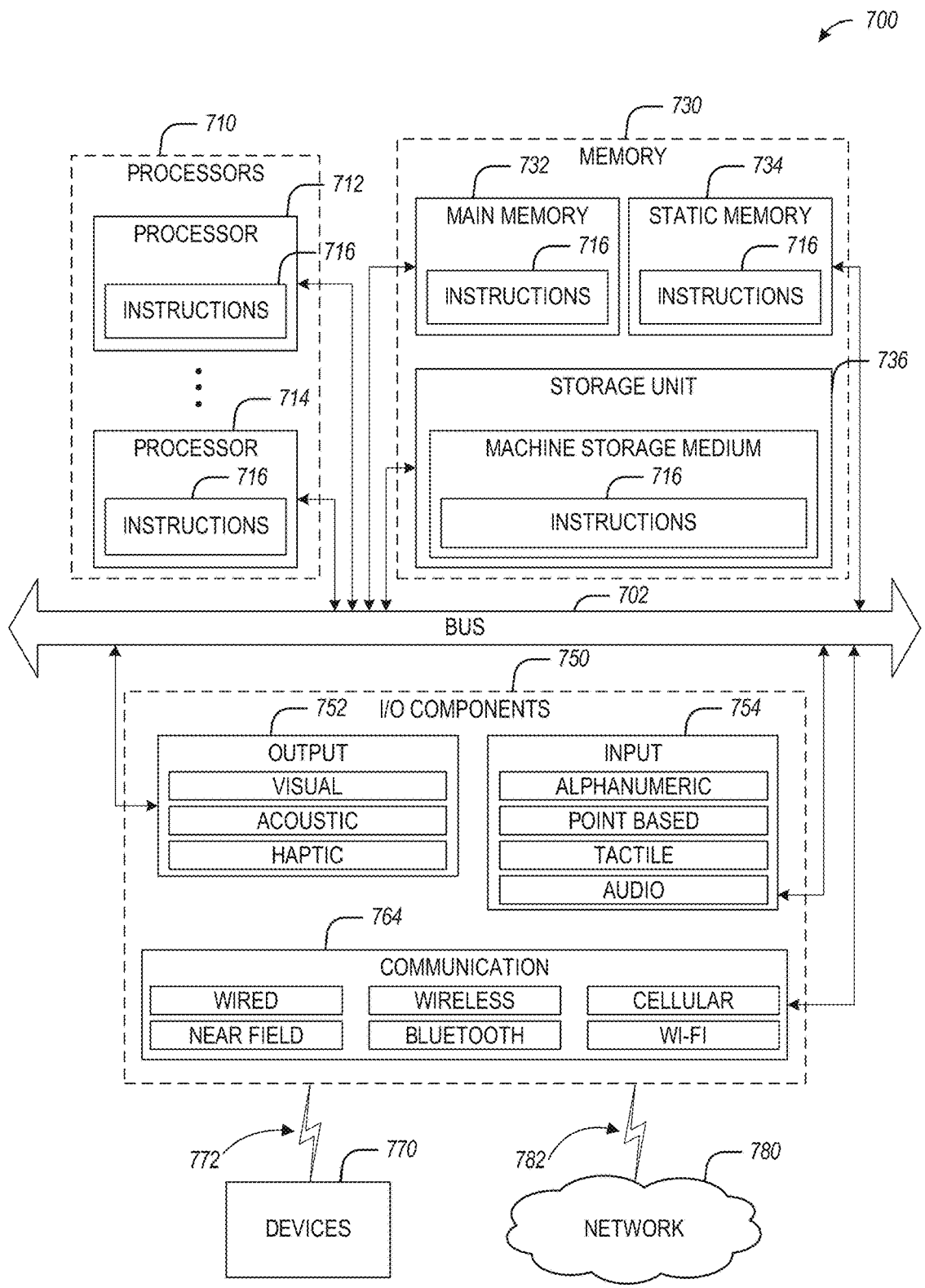
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods 400 or 500. In this way, the instructions 716 transform a general, non-programmed machine into a particular machine 700 (e.g., the compute service manager 108, the execution platform 110, and the data storage devices 206) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108, the execution platform 110, and the devices 770 may include the data storage device 206 or any other computing device described herein as being in communication with the database system 102 or the storage platform 104.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 400 or 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A data platform comprising:
   at least one hardware processor; and
   at least one memory storing instructions that cause the at least one hardware processor to perform operations comprising:
   receiving a request by a first account to replicate a source share on a source deployment of the data platform on a target deployment of the data platform, the source share being associated with the first account, the source share being configured to grant one or more accounts access to a set of database objects associated with the first account; and
   in response to the request, replicating the source share on the target deployment as a replicated share by:
   accessing, on the source deployment, share data defining the source share;
   determining, based on the share data, a set of dependencies that identify one or more database objects on the source deployment from which at least one database object of the set of database objects depends;
   generating, on the source deployment, a replication group configured to replicate the source share on the target deployment as the replicated share, the replication group being configured with a refresh schedule, the refresh schedule enabling a change to a definition of the share data on the source deployment to be applied to a definition of the replicated share on the target deployment; and
   replicating, based on the replication group, the one or more database objects, of the source deployment, on the target deployment.

2. The data platform of claim 1, wherein the replicating of the one or more database objects on the target deployment comprise:

replicating the one or more database objects into a hidden namespace on the target deployment.

3. The data platform of claim 2, wherein the hidden namespace is associated with the first account on the target deployment.

4. The data platform of claim 1, wherein the determining of the set of dependencies based on the share data comprises:
    determining, based on the share data, the set of database objects to which the source share is granting access on the source deployment.

5. The data platform of claim 1, wherein the replicating of the source share on the target deployment as the replicated share comprises:
    generating the replicated share on the target deployment with a same name as the source share of the source deployment, the replicated share being configured to grant a second account on the target deployment with access to the set of database objects replicated on the target deployment.

6. The data platform of claim 5, wherein the generating of the replicated share on the target deployment with the same name as the source share comprises:
    determining whether an existing share on the target deployment has the same name; and
    in response to determining that the existing share on the target deployment has the same name, prompting a user to rename the replicated share to a different name.

7. The data platform of claim 1, wherein the set of database objects comprises at least one of an access grant, a table, a view, or a schema.

8. A method comprising:
    receiving a request by a first account to replicate a source share on a source deployment of a data platform on a target deployment of the data platform, the source share being associated with the first account, the source share being configured to grant one or more accounts access to a set of database objects associated with the first account; and
    in response to the request, replicating the source share on the target deployment as a replicated share by:
    accessing, on the source deployment, share data defining the source share;
    determining, based on the share data, a set of dependencies that identify one or more database objects on the source deployment from which at least one database object of the set of database objects depends;
    generating, on the source deployment, a replication group configured to replicate the source share on the target deployment as the replicated share, the replication group being configured with a refresh schedule, the refresh schedule enabling a change to a definition of the share data on the source deployment to be applied to a definition of the replicated share on the target deployment; and
    replicating, based on the replication group, the one or more database objects, of the source deployment, on the target deployment.

9. The method of claim 8, wherein the replicating of the one or more database objects on the target deployment comprise:
    replicating the one or more database objects into a hidden namespace on the target deployment.

10. The method of claim 9, wherein the hidden namespace is associated with the first account on the target deployment.

11. The method of claim 8, wherein the determining of the set of dependencies based on the share data comprises:
    determining, based on the share data, the set of database objects to which the source share is granting access on the source deployment.

12. The method of claim 8, wherein the replicating of the source share on the target deployment as the replicated share comprises:
    generating the replicated share on the target deployment with a same name as the source share of the source deployment, the replicated share being configured to grant a second account on the target deployment with access to the set of database objects replicated on the target deployment.

13. The method of claim 12, wherein the generating of the replicated share on the target deployment with the same name as the source share comprises:
    determining whether an existing share on the target deployment has the same name; and
    in response to determining that the existing share on the target deployment has the same name, prompting a user to rename the replicated share to a different name.

14. The method of claim 8, wherein the set of database objects comprises at least one of an access grant, a table, a view, or a schema.

15. A computer-storage medium comprising instructions that, when executed by one or more processors of a machine, configure the machine to perform operations comprising:
    receiving a request by a first account to replicate a source share on a source deployment of a data platform on a target deployment of the data platform, the source share being associated with the first account, the source share being configured to grant one or more accounts access to a set of database objects associated with the first account; and
    in response to the request, replicating the source share on the target deployment as a replicated share by:
    accessing, on the source deployment, share data defining the source share;
    determining, based on the share data, a set of dependencies that identify one or more database objects on the source deployment from which at least one database object of the set of database objects depends;
    generating, on the source deployment, a replication group configured to replicate the source share on the target deployment as the replicated share, the replication group being configured with a refresh schedule, the refresh schedule enabling a change to a definition of the share data on the source deployment to be applied to a definition of the replicated share on the target deployment; and
    replicating, based on the replication group, the one or more database objects, of the source deployment, on the target deployment.

16. The computer-storage medium of claim 15, wherein the replicating of the one or more database objects on the target deployment comprise:
    replicating the one or more database objects into a hidden namespace on the target deployment.

17. The computer-storage medium of claim 16, wherein the hidden namespace is associated with the first account on the target deployment.

18. The computer-storage medium of claim 15, wherein the determining of the set of dependencies based on the share data comprises:
    determining, based on the share data, the set of database objects to which the source share is granting access on the source deployment.

19. The computer-storage medium of claim 15, wherein the replicating of the source share on the target deployment as the replicated share comprises:
   generating the replicated share on the target deployment with a same name as the source share of the source deployment, the replicated share being configured to grant a second account on the target deployment with access to the set of database objects replicated on the target deployment.

20. The computer-storage medium of claim 19, wherein the generating of the replicated share on the target deployment with the same name as the source share comprises:
   determining whether an existing share on the target deployment has the same name; and
   in response to determining that the existing share on the target deployment has the same name, prompting a user to rename the replicated share to a different name.

* * * * *